(12) United States Patent
Hansen et al.

(10) Patent No.: US 9,316,509 B2
(45) Date of Patent: Apr. 19, 2016

(54) SYSTEM AND METHOD FOR MEASURING ROTATION SPEED AND DIRECTION OF TAPPETS (LIFTERS) OF AN ENGINE VALVE TRAIN

(71) Applicant: Southwest Research Institute, San Antonio, TX (US)

(72) Inventors: Gregory A. T. Hansen, San Antonio, TX (US); Peter M. Lee, Fair Oaks Ranch, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 297 days.

(21) Appl. No.: 13/975,665

(22) Filed: Aug. 26, 2013

(65) Prior Publication Data

US 2015/0054497 A1 Feb. 26, 2015

(51) Int. Cl.
*G01D 5/245* (2006.01)

(52) U.S. Cl.
CPC .................................. *G01D 5/2451* (2013.01)

(58) Field of Classification Search
None
See application file for complete search history.

(56) References Cited

U.S. PATENT DOCUMENTS

| 4,313,414 A * | 2/1982 | Planteline ...................... 123/612 |
| 2003/0151402 A1* | 8/2003 | Kindler ..................... 324/207.17 |
| 2008/0074104 A1* | 3/2008 | Sauer et al. .............. 324/207.22 |

OTHER PUBLICATIONS

Mufti, et al, "Novel Method of Measuring Tappet Rotation and the Effect of Lubricant Rheology", Tribolgy International, Apr. 4, 2008, 1039-1048, vol. 41, Elsevier Ltd.

* cited by examiner

*Primary Examiner* — Melissa Koval
*Assistant Examiner* — Courtney McDonnough
(74) *Attorney, Agent, or Firm* — Livingston Law Firm

(57) ABSTRACT

A method of measuring direction of rotation of a tappet of an engine valve train. Two opposing notches are machined or otherwise formed in the outer surface of the tappet. Two sensors proximate the outer surface of the tappet are operable to detect the change in distance resulting from the notches as the tappet rotates. There is a predetermined difference angle of separation between the arc distance between the notches and the arc distance between the sensors. Each sensor outputs a square wave output having pulses whose width represents detection of the notches by the sensor. The location of the pulses of the two square wave outputs is compared to determine direction of rotation of the tappet.

15 Claims, 3 Drawing Sheets

SYSTEM AND METHOD FOR MEASURING ROTATION SPEED AND DIRECTION OF TAPPETS (LIFTERS) OF AN ENGINE VALVE TRAIN

TECHNICAL FIELD OF THE INVENTION

This invention relates to engines having valve trains with tappets (lifters), and more particularly to measuring rotation of tappets in such engines.

BACKGROUND OF THE INVENTION

A conventional reciprocating internal combustion engine facilitates combustion within its cylinders by using valves to control air and fuel flow into and out of the cylinders. To control the opening and closing of the valves, engines use a "valve train", which is an assembly of components that transmit motion throughout the assembly.

Depending on its type, a valve train may consist of various valves, rocker arms, pushrods, tappet lifters, and camshaft(s). The opening, closing and duration of valves control the amount of air and fuel entering the combustion chamber at any given point in time. Timing for valve opening, closing and duration is controlled by the camshaft, which is synchronized to the crankshaft by a chain, belt or gear.

Tappet lifters (also called simply tappets or lifters or cam followers) are made to move vertically by the action of the cam. In overhead valve (as opposed to overhead cam) valve trains, each tappet lifter drives a long thin pushrod, up to the top of the engine above the cylinder heads. The camshaft pushes on the tappet lifter, which pushes on the pushrod, which pushes on a rocker arm, which pivots and pushes down on the valve. In contrast, in overhead cam valve trains, some are "direct-acting" so that there may or may not be rocker arms and pushrods.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

The following description is directed to a system and method for measuring rotation of an engine valve train tappet during operation of the engine. As explained below, the measurement system outputs tappet rotation speed, rotation direction and direction change.

For purposes of this description, the term "tappet" is used. As stated in the Background, the terms "tappet" and "lifter" are used synonymously when speaking of valve train components. The term "cam follower" is also sometimes used.

Although, for purposes of example, this description is in terms of a direct-acting overhead cam valve train, the system and method can be used with any camshaft-driven valve train. For example, the system and method could be used with an overhead valve or dual overhead cam drive train, as well as other configurations. In general, the system and method can be used with any engine having one or more tappets subject to rotation.

Figure 1:
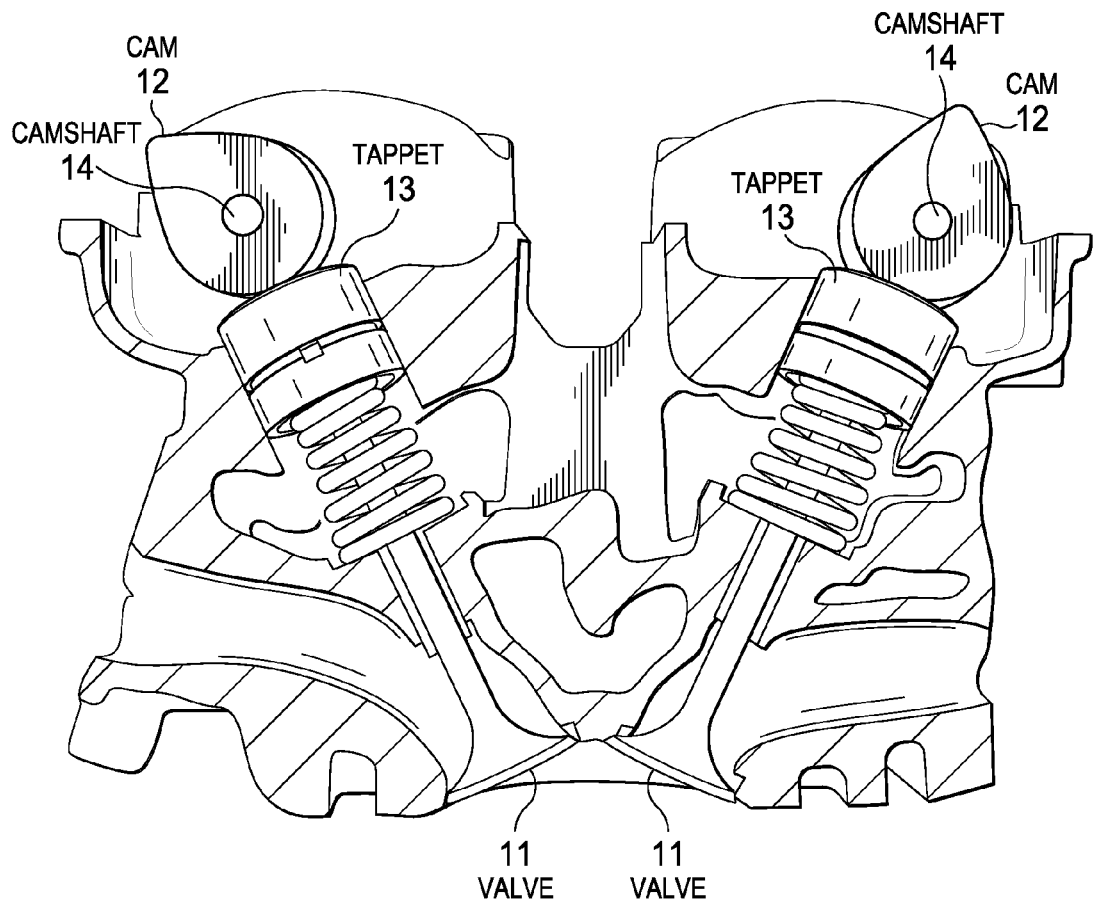
FIG. 1 is a cut-away view of a portion of an engine valve train, with two valves and their associated cam lobes and tappets.

FIG. 1 is a cut-away view of a portion of an engine valve train, showing two valves 11 and their associated cam lobes 12 and tappets 13. This is a direct-acting overhead cam configuration, which eliminates rocker arms; as stated in the Background, other valve train configurations may use intermediary rocker arms and pushrods that translate lifter motion from one direction to another. The tappets 13 may be either hydraulic or solid (non hydraulic).

The cam lobes 12 rotate as a result of rotation of the camshaft 14 to which they are attached. As each cam lobe 12 rotates, it contacts the top surface of its associated tappet 13, and drives the tappet 13 away from the camshaft's rotational axis. The tappet 13, which is constrained by a bore in which it moves, produces a linear motion along the bore axis. That linear motion is transmitted to the stem of valve 11. The motion of the valve stem causes the valve 11 to move along the axis of the bore in which it rides. This results in opening and closing of the valve 11.

It is known that a large source of friction in the valve train is from the interaction of a cam 12 and tappet 13. Various valve train lubrication schemes are used, varying with the valve train configuration. For an overhead cam, for example, the oil may be carried to the cam and spilled onto contact points between the cam and valve stems. After lubricating various components, the oil flows down channels in the engine head and block to the sump to be circulated again.

Many valve train configurations are designed to encourage rotation of the tappet 13 as it interacts with the cam 12. Tappet rotation can reduce friction and allow improved lubrication during the interaction of the cam and tappet. For example, one type of direct-acting overhead cam facilitates tappet rotation by providing a cam that is slightly conical and a dome-shaped top surface of the tappet.

The speed and uniformity of tappet rotation can greatly affect wear on valve train components. The study of tappet rotation in production engine environments is important to developing improved engine systems. In particular, knowledge of tappet rotation can provide understanding of the effect of lubricant properties, such as viscosity and individual lubricant chemical components such as additives, on tappet rotation. Proper lubricant choice will reduce wear and improve engine durability, as well as reduce energy consumption and improve fuel economy.

Figure 2:
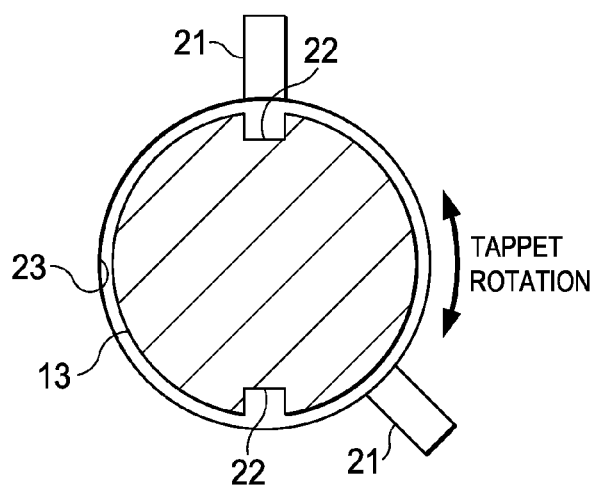
FIG. 2 is a plan view of the top surface of a tappet and tappet rotation measurement sensors in accordance with the invention.

FIG. 2 is a plan view of the top surface of a tappet 13 and tappet rotation measurement system in accordance with the invention. It is assumed that the cross-sectional geometry of the tappet 13, at least in the location of sensors 21, is generally circular. As indicated by the arrow, the tappet 13 is capable of rotating within its bore 23. This rotation may be in either direction (clockwise or counter-clockwise). The speed and/or the direction of rotation may change during engine operation.

The measurement system comprises two sensors 21 placed near the outer periphery of the tappet 13 at a predetermined distance apart. As explained below, sensors 21 may be placed in the tappet bore 23, at or near the surface of the bore, such that they are proximate to the outer surface of the tappet 13 but do not interfere with tappet motion. For example, the sensor heads of sensors 21 may be placed at the end of a small channel through the bore wall. The sensor heads may be located at various heights along the vertical axis of the tappet 13, but both sensors 21 are generally in the same vertical plane such that both detect the same circumferential path around the outer surface of the tappet.

Each sensor 21 is an eddy current sensor. Eddy-current sensors are non-contact sensors that measure the change of position of a conductive target. Eddy-current sensors are also sometimes called inductive sensors.

Eddy-current sensors operate with magnetic fields. A sensor driver generates an alternating current in a sensing coil in the end of the sensor probe. This creates an alternating magnetic field that induces small currents in the target material. These currents, called eddy currents, create an opposing magnetic field that resists the field being generated by the sensing coil in the sensor head. The interaction of the magnetic fields is dependent on the distance between the probe and the target. As the distance changes, the sensor electronics sense the change in the magnetic field interaction, and produce a voltage output proportional to the change in distance between the sensor head and target.

Thus, eddy-current sensors are basically position measuring devices. In the system of FIG. 2, the sensors 21 provide square wave (pulse) inputs to a signal processing system (described below). As explained in further detail below, these sensor outputs indicate the size of the gap between the sensor head and the outer surface of the tappet. This gap changes due to two notches 22 in the outer surface of the tappet 13. Because the sensors 21 are in fixed positions, any changes in the output are interpreted as changes in position of the tappet. In general, tappet rotation is detected by detection of step changes in the sensor outputs due to the notches 22.

Sensors 21 are separated around the circumference of the tappet by a predetermined distance. In the example of FIG. 2, this separation is 160 degrees. As explained below, this separation may vary to some extent in different embodiments of the sensor system. Typically, the arc distance between the sensors will be in a range from 150 to 170 degrees.

Tappet 13 has two notches 22 in its outer surface. In the embodiment of FIG. 2, these notches 22 are "opposing" in the sense that they are 180 degrees apart. As tappet 13 rotates, when a notch 21 passes a sensor 21, the distance from the head of the sensor 21 to the outer surface of the tappet 13 is greater than when the un-notched surface of the tappet 13 passes the sensor 21.

Notches 22 may be machined into the surface of the tappet. They have a predetermined width, which is referred to herein as the notch "arc width". Their length (vertically along the axis of the tappet) is sufficient so that the sensors 21 may detect the notches regardless of vertical motion of the tappet. Typically, the notches 21 are machined above any oil channel that may be present around the circumference of the tappet.

Thus, both the sensors 21 and the notches 22 have predetermined angles of separation. In the embodiment of FIG. 2, these angles of separation are 160 degrees and 180 degrees, respectively. The difference between these angles of separation is 20 degrees, and is referred to herein as the "difference angle of separation".

Figure 3:
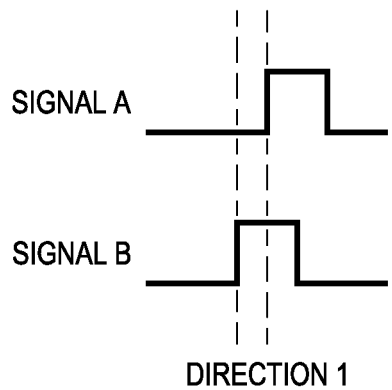
FIGS. 3 and 4 illustrate the output of the two sensors of FIG. 2, identified as Signal A and Signal B, for two directions (counterclockwise and clockwise).
Figure 4:
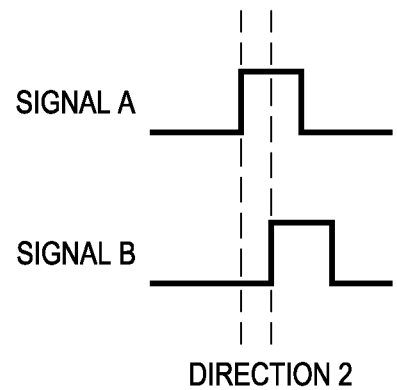

FIGS. 3 and 4 illustrate the outputs of the two sensors, identified as Signal A and Signal B, from Sensor A and Sensor B, respectively. FIG. 3 is the output from a first direction (counterclockwise or clockwise), and FIG. 4 is the output from the other direction.

Each pulse width represents the width (arc-length) of a notch 22. The difference between the leading edges of the pulses from the two sensor outputs is indicated by the vertical dashed lines. This difference represents the "difference angle of separation" of the sensors. As stated above, for notches placed 180 degrees apart, and sensors with a 160 degree separation, the "difference angle of separation" is 20 degrees.

In one direction, the pulse of Sensor A leads the pulse of Sensor B. In the other direction, the pulse of Sensor A trails the pulse of Sensor B. In this manner, the direction of rotation of the tappet 13 can be detected.

Preferably, the difference angle of separation of the sensors 21 is less than the arc-length of the notches 22. This ensures sufficient differentiation by the measurement system. Thus, for example, with a difference angle of separation of 20 degrees, the notch width (relative to the outer circumference of the tappet) might be in the range of 30 to 35 degrees. In other words, the notch arc width is 10 to 15 degrees greater than the difference angle of separation of the sensors 21. This facilitates identification of the difference between the edges of the pulse output from the two sensors.

The speed of rotation is determined either from the distance between pulses or the pulse width. The system of FIG. 2 is also capable of determining the number of direction changes in a given amount of time.

As compared to a measurement system having a single sensor, the system of FIG. 2 allows a comparison of tappet rpm (speed of rotation) with direction. With a single sensor, if a lubricant is performing poorly, the rpm measurement can indicate a higher speed than is mechanically possible. With two sensors, comparison of speed and direction will determine whether the measured rpm is valid. If direction is changing rapidly, which would be accompanied by a high rpm speed, the sensor is not measuring rotation, but rather oscillation.

Figure 5:
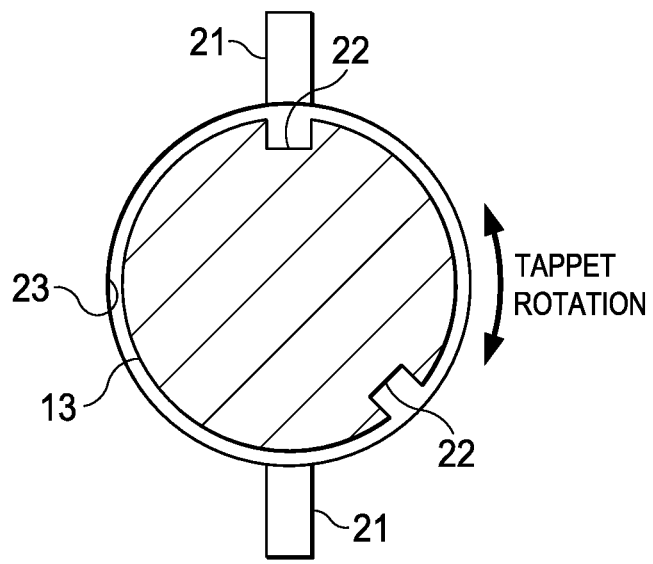
FIG. 5 illustrates an alternative embodiment, in which the positions of the sensors and notches are switched.

FIG. 5 illustrates an alternative embodiment, in which the positions of the sensors 21 and notches 22 are switched. This embodiment operates in the same manner as the embodiment of FIG. 2 above. In each embodiment, the distance (in arc angle degrees) between the sensors 21 is different from the distance between the notches 22. In both embodiments, the "difference angle of separation" is preferably less than the arc width of the notches 22.

Figure 6:
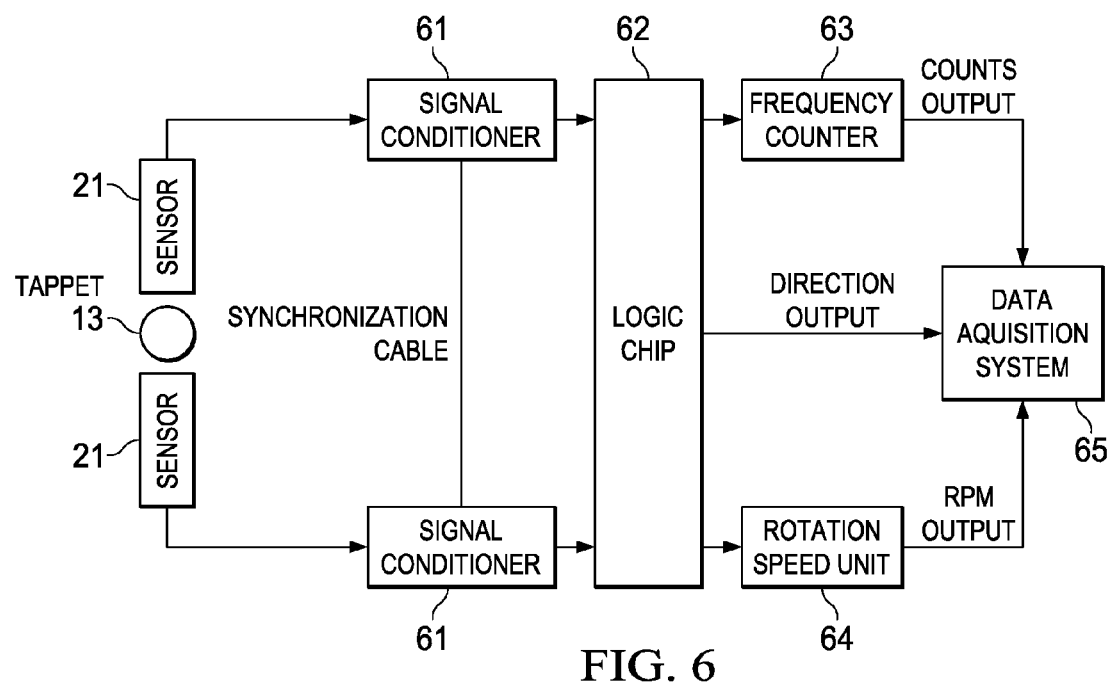
FIG. 6 illustrates instrumentation for measuring rotation, using the sensor/notch arrangement of FIG. 2 or 5.

FIG. 6 illustrates instrumentation for measuring tappet rotation, using the sensor/notch arrangement of FIG. 2 or 5. The square wave outputs of the sensors 21 are delivered to separate signal conditioners 61, where the two output signals are synchronized.

A logic unit 62 is programmed to interpret the output to determine direction of rotation, by comparing pulse edges of the two sensor outputs, as described above in connection with FIGS. 3 and 4. Logic unit 62 delivers a signal representing rotation direction to a data acquisition unit 65, which stores, displays or otherwise reports the information.

Logic unit 62 also delivers a signal representing direction change to a counter 63, which counts the number of direction changes. This number is delivered to data acquisition unit 65, which uses the data to calculate a rate of direction change. Data acquisition unit 65 may also determine if there is true direction change or oscillation.

Logic unit 62 also delivers a signal representing rotation speed unit 64. This unit 64 uses pulse width or distance between pulses to determine speed of rotation (rpm), and delivers this data to data acquisition unit 65.

Logic unit 62, frequency counter 63, pulse width monitor 64, and data acquisition unit 65 may be implemented with various hardware, software, and/or firmware, appropriately programmed to perform the above-described tasks. The separation of these devices into the various "units" is somewhat arbitrary, significant to the task to be performed, and it is possible that performance of their various tasks could be integrated in a single unit.

What is claimed is:

1. A method of measuring direction of rotation of a tappet of an engine valve train, comprising:
   providing two notches in the outer surface of the tappet each notch having the same or different notch width;
   wherein the notches are radially spaced and have a common circumferential path on the outer surface of the tappet;
   providing two sensors proximate the outer surface of the tappet, radially spaced on a path around the perimeter of the tappet and operable to detect changes in circumference of the tappet resulting from the notches as the tappet rotates;
   wherein there is a predetermined difference angle of separation between the arc distance between the notches and the arc distance between the sensors;
   wherein the arc distance between the sensors is greater than the arc width of each of the notches;
   receiving a square wave output from each of the sensors, each square wave output having pulses whose width represents detection of the notches by the sensor; and
   comparing the location of the pulses of the two square wave outputs to determine direction of rotation of the tappet.

2. The method of claim 1, wherein the sensors are eddy current sensors.

3. The method of claim 1, wherein the arc distance between the notches is 180 degrees and the arc distance between the sensors is in a range of 150 to 170 degrees.

4. The method of claim 1, wherein the arc width of the notches is greater than the difference angle of separation.

5. The method of claim 1, further comprising determining the speed of rotation from either the distance between pulses or pulse width.

6. The method of claim 1, further comprising determining the rate of change of direction of rotation.

7. The method of claim 1, wherein the step of providing two sensors is performed by mounting the sensors in the tappet bore wall.

8. The method of claim 1, wherein the arc distance between the sensors is 180 degrees and the arc distance between the notches is in a range of 150 to 170 degrees.

9. A system for measuring direction of rotation of a tappet of an engine valve train, the tappet having two notches in its outer surface, the notches being spaced radially and having a common circumferential path on the other surface of the tappet, the system comprising:
   two sensors proximate the outer surface of the tappet, radially spaced on a path along the perimeter of the tappet and operable to detect changes in circumference of the tappet resulting from the notches as the tappet rotates;
   wherein there is a predetermined difference angle of separation between the arc distance between the notches and the arc distance between the sensors;
   wherein the arc distance between the sensors is greater than the width of each of the notches; and
   a logic unit programmed to receive a square wave output from each of the sensors, each square wave output having pulses whose width represents detection of the notches by the sensor, and to compare the location of the pulses of the two square wave outputs to determine direction of rotation of the tappet.

10. The method of claim 9, wherein the sensors are eddy current sensors.

11. The method of claim 9, wherein the arc distance between the notches is 180 degrees and the arc distance between the sensors is in a range of 150 to 170 degrees.

12. The method of claim 9, wherein the arc width of the notches is greater than the difference angle of separation.

13. The method of claim 9, further comprising a pulse width monitor for determining the speed of rotation from either the distance between pulses or pulse width.

14. The method of claim 9, further comprising a frequency counter for determining the rate of change of direction of rotation.

15. The system of claim 9, wherein the arc distance between the sensors is 180 degrees and the arc distance between the notches is in a range of 150 to 170 degrees.

* * * * *